(12) United States Patent
Komori et al.

(10) Patent No.: US 10,148,078 B2
(45) Date of Patent: Dec. 4, 2018

(54) SEAL STRUCTURE FOR CABLE, AND SEAL MEMBER

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hirokazu Komori, Yokkaichi (JP); Makoto Higashikozono, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/770,812

(22) PCT Filed: Nov. 11, 2016

(86) PCT No.: PCT/JP2016/083470
§ 371 (c)(1),
(2) Date: Apr. 25, 2018

(87) PCT Pub. No.: WO2017/082376
PCT Pub. Date: May 18, 2017

(65) Prior Publication Data
US 2018/0316174 A1    Nov. 1, 2018

(30) Foreign Application Priority Data
Nov. 12, 2015 (JP) .................. 2015-221876

(51) Int. Cl.
*H01R 13/40* (2006.01)
*H02G 15/04* (2006.01)
(Continued)

(52) U.S. Cl.
CPC ............. *H02G 15/04* (2013.01); *H02G 3/088* (2013.01); *H02G 15/013* (2013.01); *H01R 2201/26* (2013.01)

(58) Field of Classification Search
CPC ...... H02G 3/088; H02G 15/04; H02G 15/013; H01R 2201/26; H01R 7/02; H01R 7/044; H01R 13/40
(Continued)

(56) References Cited

U.S. PATENT DOCUMENTS 5,720,487 A * 2/1998 Kato .................. H01R 13/5205
277/637
6,341,983 B1 * 1/2002 Crawford ............. H01R 13/521
439/275
(Continued)

FOREIGN PATENT DOCUMENTS

JP    H11329567 A    11/1999
JP    2012182924 A    9/2012

OTHER PUBLICATIONS

International Search Report for Application No. PCT/JP2016/083470 dated Jan. 31, 2017; 4 pages.

*Primary Examiner* — William H Mayo, III
(74) *Attorney, Agent, or Firm* — Reising Ethington, P.C.

(57) ABSTRACT

A seal structure for a cable includes a cable in which first to fourth electrical wires are enveloped by a sheath, the first to fourth electrical wires extending out from an end portion of the sheath, a rubber plug that is fitted around the end portion of the sheath, and an inner support member arranged inside the end portion of the sheath.

10 Claims, 19 Drawing Sheets

(51) Int. Cl.
*H02G 15/013* (2006.01)
*H02G 3/08* (2006.01)

(58) Field of Classification Search
USPC .................................. 174/74 R, 75, 77 R, 78
See application file for complete search history.

(56) References Cited

U.S. PATENT DOCUMENTS

| | | | | |
|---|---|---|---|---|
| 6,602,090 | B2* | 8/2003 | Kato | H01R 13/5205 |
| | | | | 439/455 |
| 6,609,932 | B2* | 8/2003 | Fukatsu | H01R 13/4368 |
| | | | | 439/274 |
| 7,033,216 | B2* | 4/2006 | Ito | H01R 13/5208 |
| | | | | 439/275 |
| 7,044,762 | B1* | 5/2006 | Hong | H01R 13/5213 |
| | | | | 439/275 |
| 7,104,841 | B2* | 9/2006 | Fukatsu | H01R 13/5208 |
| | | | | 439/275 |
| 2001/0049226 | A1* | 12/2001 | Murakami | H01R 13/5205 |
| | | | | 439/587 |
| 2009/0215298 | A1* | 8/2009 | Chazottes | H01R 13/5208 |
| | | | | 439/275 |
| 2013/0105219 | A1 | 5/2013 | Osawa et al. | |

* cited by examiner

SEAL STRUCTURE FOR CABLE, AND SEAL MEMBER

CROSS REFERENCE TO RELATED APPLICATIONS

This application claims the priority of Japanese patent application JP2015-221876 filed on Nov. 12, 2015, the entire contents of which are incorporated herein.

TECHNICAL FIELD

The present invention relates to a seal structure for a cable, and a seal member.

BACKGROUND ART

Conventionally, the waterproof structure disclosed in JP 2003-17476A (Patent Document 1) is known as a structure for waterproofing terminal portions of a cable. In this structure, a tubular member is fitted around a front end of a sheath of a cable from which a plurality of electrical wires are drawn out, and this tubular member is filled with a sealing material such as a silicone-based adhesive.

SUMMARY

According to the above-described configuration, the sheath is pressed inwardly by the tubular member in a portion of the tubular member that is fitted around the sheath. If a gap is present between the sheath and the plurality of electrical wires, then the sheath is pressed inwardly and deforms, and thus there is a concern that a gap will be formed between an inner surface of the tubular member and an outer surface of the sheath. Also, there is a concern that water enters from the gap formed between the inner surface of the tubular member and the outer surface of the sheath.

The technology disclosed in this specification provides a seal structure for a cable, and a seal member, with a high sealing property.

The technology disclosed in this specification is a seal structure for a cable, the seal structure including a cable in which an electrical wire is enveloped by a sheath, the electrical wire extending out from an end portion of the sheath, a rubber plug that is fitted around the end portion of the sheath, and an inner support member having a support portion arranged inside the end portion of the sheath.

Also, the technology disclosed in this specification is a seal member for attachment to a cable in which an electrical wire is enveloped by a sheath, the electrical wire extending out from an end portion of the sheath, the seal member including a rubber plug that is fitted around the end portion of the sheath, and an inner support member having a support portion arranged inside the end portion of the sheath.

According to the above-described configuration, the rubber plug that is fitted around the end portion of the sheath presses the end portion of the sheath inward. At this time, the support portion of the inner support member is arranged inside the end portion of the sheath, and thus the end portion of the sheath is reliably in close contact with the rubber plug by being held between the rubber plug and the support portion. As a result, it is possible to reliably seal the sheath and the rubber plug.

The following aspects are preferable as embodiments of the technology disclosed in this specification.

The support portion preferably has a support wall extending inward along the sheath.

According to the above-described configuration, the sheath is held between the support wall and the rubber plug, and thus it is possible to reliably seal the sheath and the rubber plug.

An outer support member that presses the rubber plug inward is preferably fitted around the rubber plug.

According to the above-described configuration, the rubber plug is pressed inward by the outer support member, and thus the sheath and the rubber plug are reliably in close contact with each other. As a result, it is possible to reliably seal the sheath and the rubber plug.

It is preferable that the cable includes a plurality of the electrical wires, the plurality of electrical wires extending out from the end portion of the sheath, and the rubber plug has a plurality of through-holes for passage of the plurality of electrical wires respectively.

According to the above-described configuration, it is possible to reliably waterproof the plurality of electrical wires.

It is preferable that the inner support member has a plurality of guide holes for passage of the plurality of electrical wires respectively, and the plurality of guide holes are arranged at positions that respectively correspond with the plurality of through-holes.

According to the above-described configuration, it is possible to reliably pass the plurality of electrical wires respectively through the plurality of through-holes provided in the rubber plug. Accordingly, it is possible to reliably achieve close contact between the outer peripheries of the electrical wires and the inner peripheries of the through-holes. As a result, it is possible to improve the sealing property of the plurality of electrical wires.

According to the technology disclosed in this specification, it is possible to improve the sealing property of a cable.

DESCRIPTION OF EMBODIMENTS

Embodiment 1

Embodiment 1 to which the technology disclosed in this specification is applied to a seal member 10 and a seal structure 12 for a cable 11 will be described with reference to FIGS. 1 to 13. The present embodiment can be applied to a wire harness for an electrical parking brake that is installed in a vehicle (not shown), for example. In the following description, the direction represented by arrow F is considered to be the frontward direction.

Figure 3:
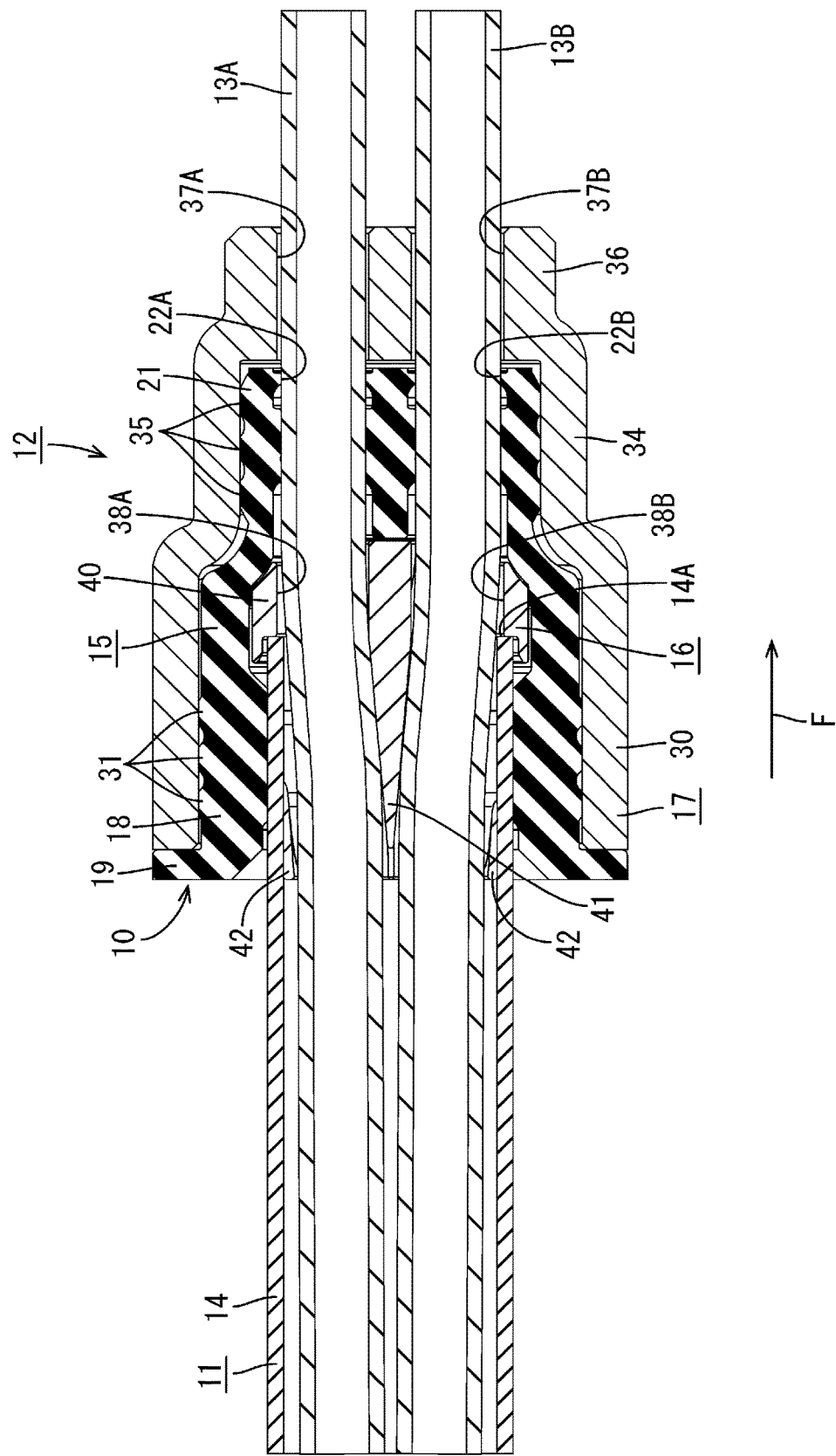
FIG. 3 is a cross-sectional view taken along line III-III in FIG. 2.
Figure 4:
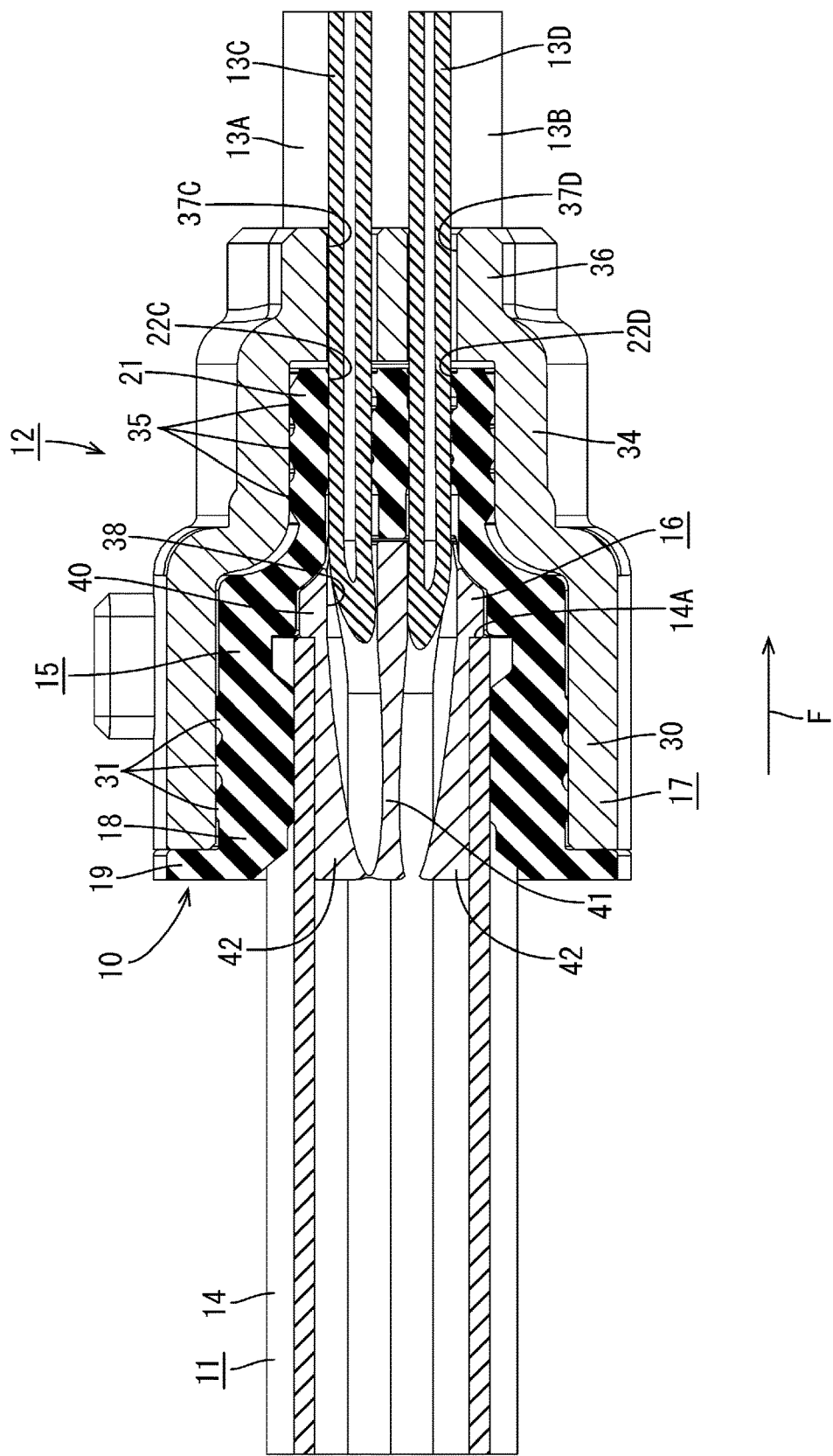
FIG. 4 is a cross-sectional view taken along line IV-IV in FIG. 2.
Figure 5:
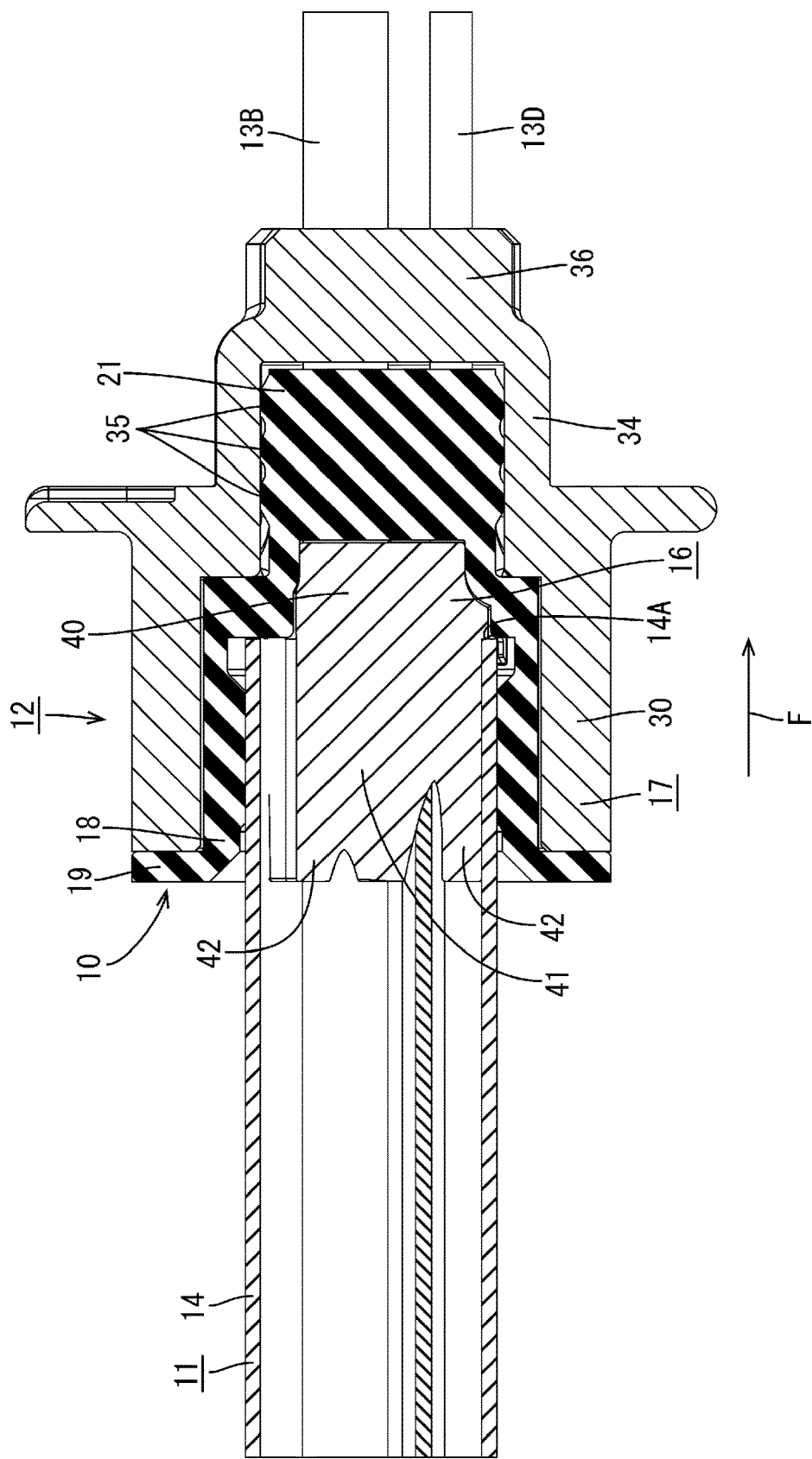
FIG. 5 is a cross-sectional view taken along line V-V in FIG. 2.
Figure 6:
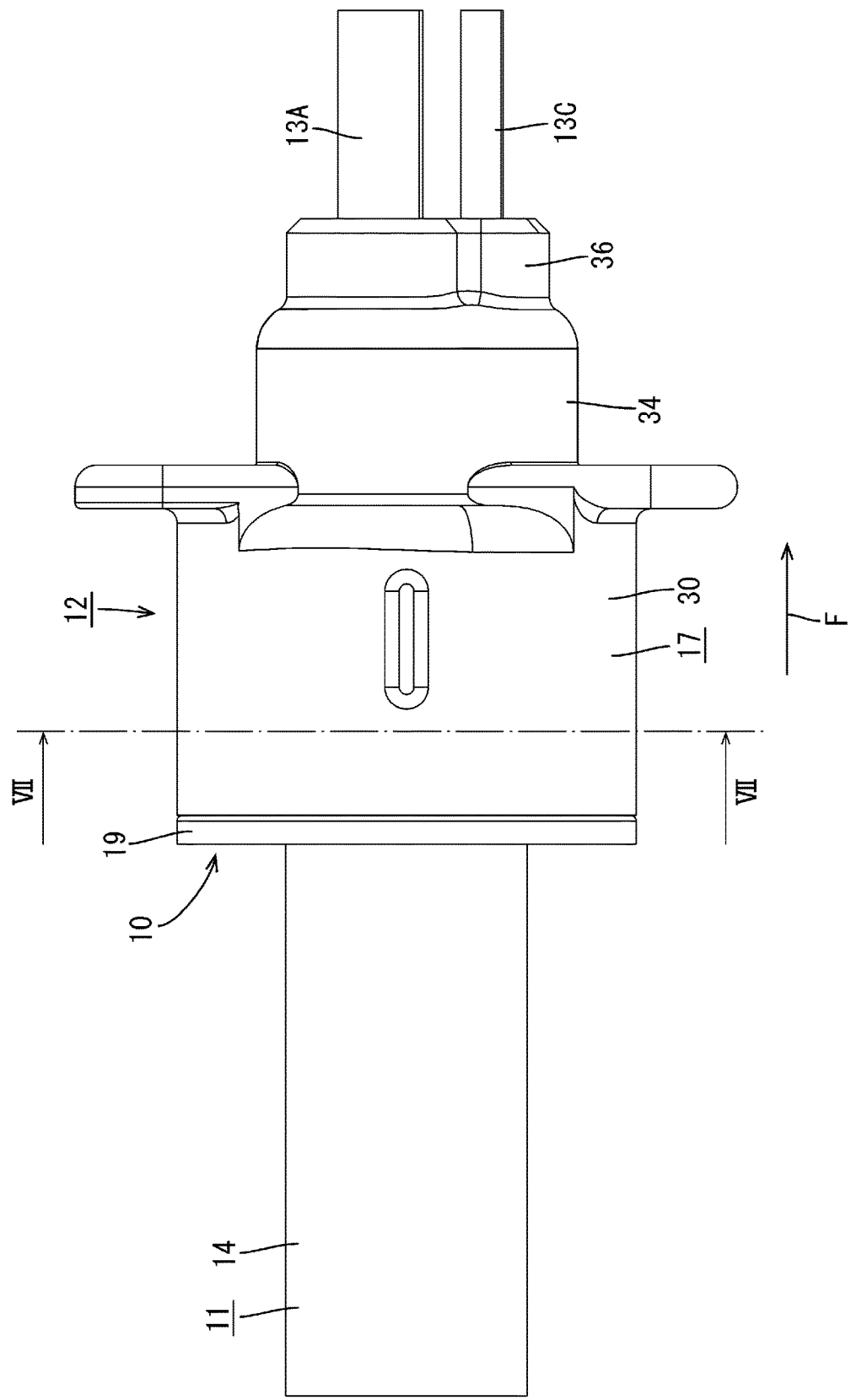
FIG. 6 is a side view showing the seal structure for a cable.

As shown in FIGS. 3 to 5, a cable 11 according to the present embodiment has a configuration in which a plurality (four in the present embodiment) of electrical wires 13A, 13B, 13C, and 13D are enveloped by a sheath 14 that is made of an insulating synthetic resin. The electrical wires 13A, 13B, 13C, and 13D have a configuration in which the outer periphery of a metal core wire (not shown) is covered by a synthetic resin insulating covering (not shown). The cable 11 has a circular cross-sectional shape.

Figure 1:
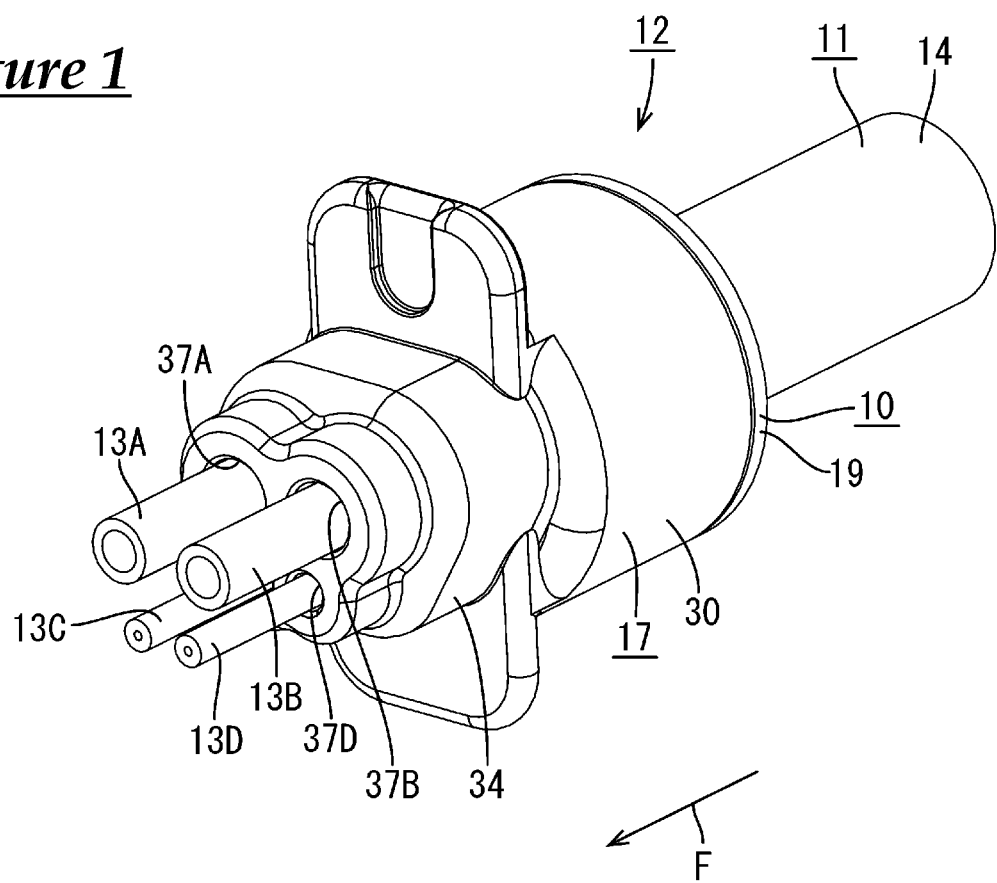
FIG. 1 is a perspective view showing a seal structure for a cable according to Embodiment 1.
Figure 2:
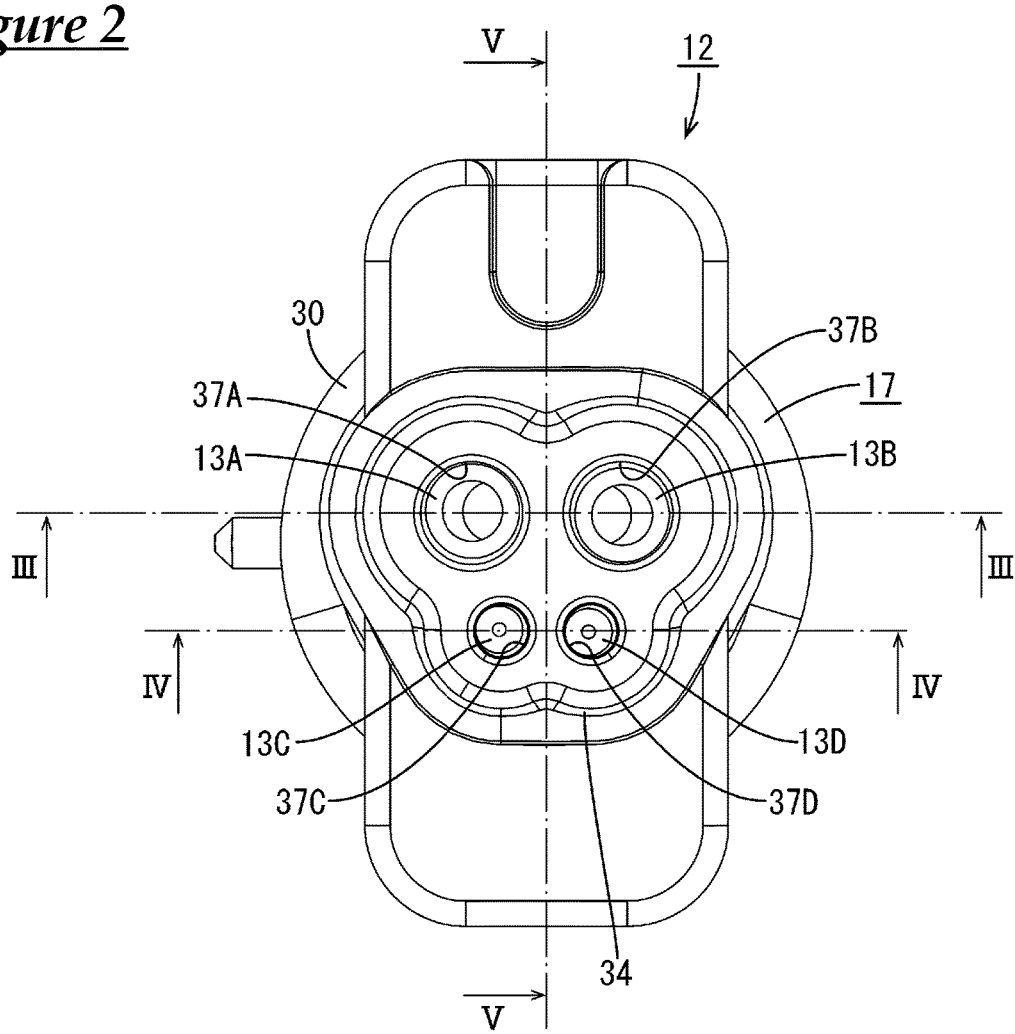
FIG. 2 is a front view showing the seal structure for a cable.

As shown in FIGS. 1 and 2, the four electrical wires 13A, 13B, 13C, and 13D include two types of electrical wires 13A, 13B, 13C, and 13D that have different outer diameters. In the present embodiment, the first electrical wire 13A and the second electrical wire 13B are for connection to an electrical parking brake motor, and the third electrical wire 13C and the fourth electrical wire 13D are for an anti-lock brake system sensor. The first electrical wire 13A, the second electrical wire 13B, the third electrical wire 13C, and the fourth electrical wire 13D have a circular cross-section. Note that the applications of the first to fourth electrical wires 13A to 13D are not limited to the above-described embodiment.

The outer diameters of the first electrical wire 13A and the second electrical wire 13B are set to be larger than the outer diameters of the third electrical wire 13C and the fourth electrical wire 13D. The outer diameter of the first electrical wire 13A is set to be the same as the outer diameter of the second electrical wire 13B. Also, the outer diameter of the third electrical wire 13C is set to be the same as the outer diameter of the fourth electrical wire 13D. The first electrical wire 13A, the second electrical wire 13B, the third electrical wire 13C, and the fourth electrical wire 13D extend and branch out from an end portion 14A of the sheath 14 of the cable 11.

As shown in FIGS. 3 to 5, the seal member 10 is attached to the end portion 14A of the sheath 14 of the cable 11, specifically to the region in which the first electrical wire 13A, the second electrical wire 13B, the third electrical wire 13C, and the fourth electrical wire 13D are branched. The intrusion of a liquid such as water or oil through the end portion 14A of the sheath 14 into the sheath 14 is suppressed by the seal member 10. The seal member 10 includes a rubber plug 15 that is fitted around the end portion 14A of the sheath 14, and an inner support member 16 that is attached to an inner portion of the rubber plug 15.

As shown in FIGS. 3 and 4, the rubber plug 15 is fitted around the end portion 14A of the sheath 14. The rubber plug 15 has a sheath fitting portion 18 that is fitted around the end portion 14A of the sheath 14. The sheath fitting portion 18 is shaped as a hood that extends (rearward) toward the side opposite to the end portion 14A of the sheath 14 and is open (rearward) in a direction opposite to the end portion 14A of the sheath 14. A flange portion 19 that protrudes outward in the diameter direction of the sheath fitting portion 18 is formed at an end edge portion of the sheath fitting portion 18. The sheath fitting portion 18 is substantially shaped as a circular tube in its natural state.

Figure 10:
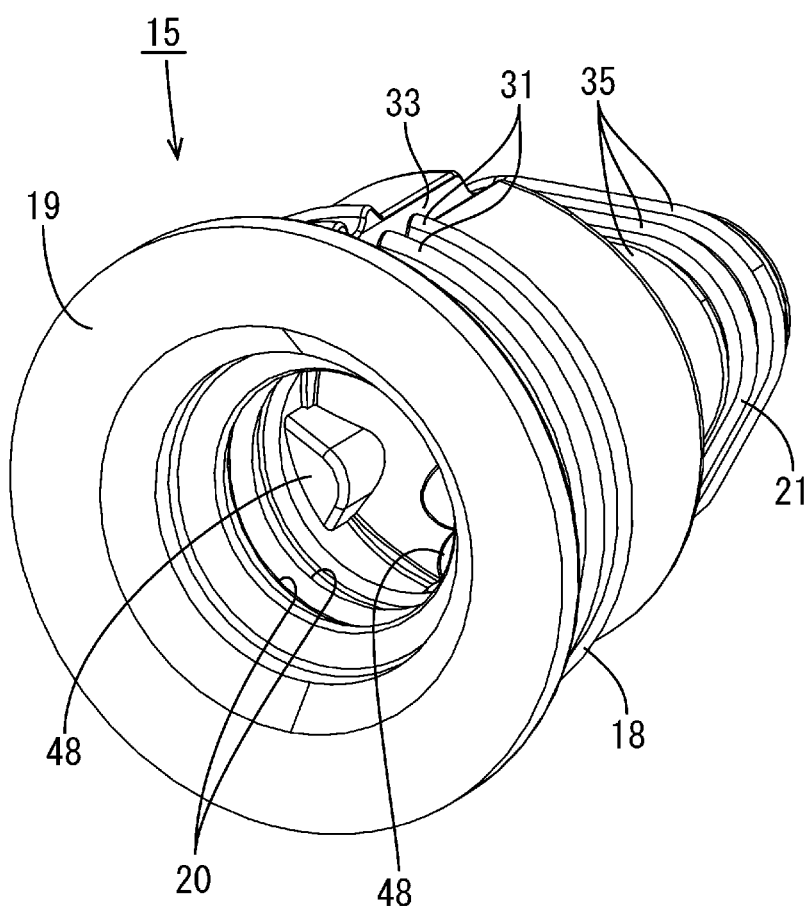
FIG. 10 is a perspective view showing the rubber plug viewed from a position different from that in FIG. 9.

As shown in FIG. 10, a plurality of sheath-side lips 20 that protrude inward are formed as rings that extend along the circumferential direction of the sheath fitting portion 18 on the inner periphery of the sheath fitting portion 18. In the state where the sheath fitting portion 18 is fitted around the end portion 14A of the sheath 14, the sheath-side lips 20 are in close contact with the outer periphery of the sheath 14. This seals the rubber plug 15 and the sheath 14.

As shown in FIGS. 3 and 4, an electrical wire through-hole portion 21 is provided at the end portion (front-end portion) that is opposite to the sheath fitting portion 18 of the rubber plug 15, and the electrical wire through-hole portion 21 has a plurality (four in the present embodiment) of through-holes 22A, 22B, 22C, and 22D for passage of the first electrical wire 13A, the second electrical wire 13B, the third electrical wire 13C, and the fourth electrical wire 13D respectively. The through-holes 22A, 22B, 22C, and 22D include a first through-hole 22A for passage of the first electrical wire 13A, a second through-hole 22B for passage of the second electrical wire 13B, a third through-hole 22C for passage of the third electrical wire 13C, and a fourth through-hole 22D for passage for the fourth electrical wire 13D.

Figure 9:
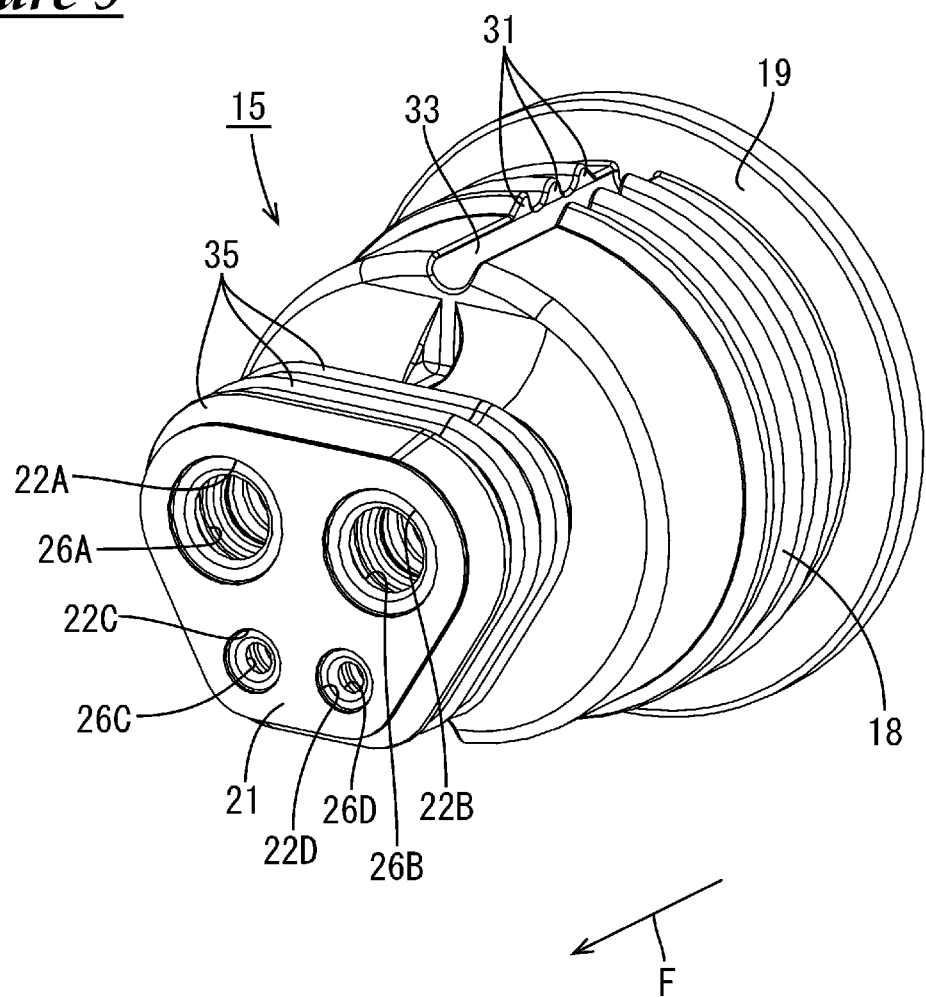
FIG. 9 is a perspective view showing a rubber plug.

As shown in FIG. 9, the cross-sectional shape of the electrical wire through-hole portion 21 is a trapezoid having rounded corners. The cross-sectional shape of the electrical wire through-hole portion 21 includes a long side, a short side that is shorter than the long side and is parallel with the long side, and two inclined sides that connect end portions of the long side to end portions of the short side.

The first through-hole 22A and the second through-hole 22B are formed side-by-side along the direction in which the long side extends at positions in the electrical wire through-hole portion 21 that are biased toward the long side. Also, the third through-hole 22C and the fourth through-hole 22D are formed side-by-side along the direction in which the short side extends at positions in the electrical wire through-hole portion 21 that are biased toward the short side.

The inner diameter of the first through-hole 22A is somewhat larger than the outer diameter of the first electrical wire 13A. As shown in FIG. 9, first electrical wire-side lips 26A that come into close contact with the outer periphery of the first electrical wire 13A are formed as rings that extend along the circumferential direction of the first through-hole 22A on the inner periphery of the first through-hole 22A. In the state where the first electrical wire 13A passes through the interior of the first through-hole 22A, the first electrical wire-side lips 26A are in close contact with the outer periphery of the first electrical wire 13A. This seals the first electrical wire 13A and the rubber plug 15.

The inner diameter of the second through-hole 22B is somewhat larger than the outer diameter of the second electrical wire 13B. As shown in FIG. 9, second electrical wire-side lips 26B that come into close contact with the outer periphery of the second electrical wire 13B are formed as rings that extend along the circumferential direction of the second through-hole 22B on the inner periphery of the second through-hole 22B. In the state where the second electrical wire 13B passes through the interior of the second through-hole 22B, the second electrical wire-side lips 26B are in close contact with the outer periphery of the second electrical wire 13B. This seals the second electrical wire 13B and the rubber plug 15.

The inner diameter of the third through-hole 22C is somewhat larger than the outer diameter of the third electrical wire 13C. As shown in FIG. 9, third electrical wire-side lips 26C that come into close contact with the outer periphery of the third electrical wire 13C are formed as rings that extend along the circumferential direction of the third through-hole 22C on the inner periphery of the third through-hole 22C. In the state where the third electrical wire 13C passes through the interior of the third through-hole 22C, the third electrical wire-side lips 26C are in close contact with the outer periphery of the third electrical wire 13C. This seals the third electrical wire 13C and the rubber plug 15.

The inner diameter of the fourth through-hole 22D is somewhat larger than the outer diameter of the fourth electrical wire 13D. As shown in FIG. 9, fourth electrical wire-side lips 26D that come into close contact with the outer periphery of the fourth electrical wire 13D are formed as rings that extend along the circumferential direction of the fourth through-hole 22D on the inner periphery of the fourth through-hole 22D. In the state where the fourth electrical wire 13D passes through the interior of the fourth through-hole 22D, the fourth electrical wire-side lips 26D are in close contact with the outer periphery of the fourth electrical wire 13D. This seals the fourth electrical wire 13D and the rubber plug 15.

As shown in FIGS. 3 to 5, the inner support member 16 is held at a position on the rubber plug 15 that is inside the sheath fitting portion 18 and between the sheath-side lips 20 and the electrical wire through-hole portion 21, and the inner support member 16 has a plurality (four in the present embodiment) of guide holes 38A, 38B, 38C, and 38D for passage of the first electrical wire 13A, the second electrical wire 13B, the third electrical wire 13C, and the fourth electrical wire 13D respectively.

As shown in FIGS. 3 to 5, the outer support member 17 made of a synthetic resin is fitted around the rubber plug 15. The outer support member 17 is fitted around the rubber plug 15 from the side (front side) on which the first electrical wire 13A, the second electrical wire 13B, the third electrical wire 13C, and the fourth electrical wire 13D extend out from the end portion 14A of the sheath 14. The outer support member 17 is open toward the sheath 14 (rearward) from the side from which the first electrical wire 13A, the second electrical wire 13B, the third electrical wire 13C, and the fourth electrical wire 13D extend out. The open end edge of the outer support member 17 is in contact with the flange portion 19 of the rubber plug 15.

Figure 12:
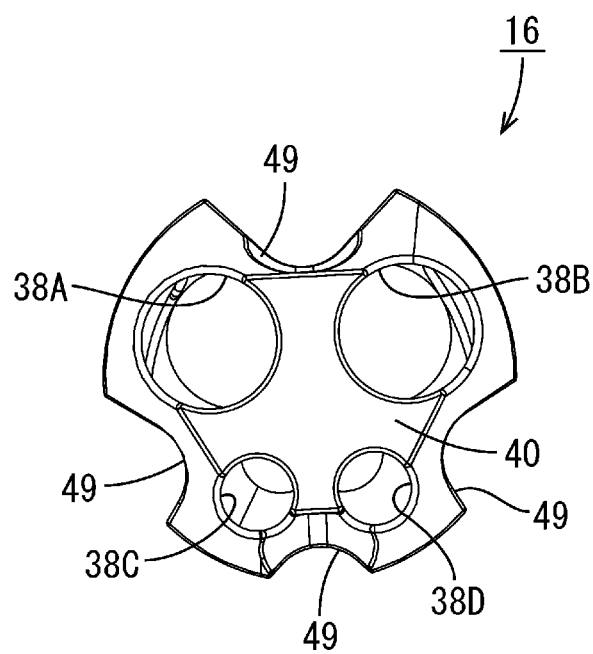
FIG. 12 is a front view showing the inner support member.

The outer support member 17 is provided with a wide portion 30 that is fitted around the sheath fitting portion 18 of the rubber plug 15 at a position on the open end edge side (rear side) of the outer support member 17. As shown in FIG. 12, the cross-sectional shape of the wide portion 30 is a circle that conforms to the outer shape of the sheath fitting portion 18. The inner periphery of the wide portion 30 comes into close contact with a plurality (three in the present embodiment) of wide portion-side lips 31 that are formed on the outer periphery of the sheath fitting portion 18. As shown in FIG. 9, the wide portion-side lips 31 are formed on the outer circumferential surface of the sheath fitting portion 18, protruding outward and extend along the circumferential direction of the sheath fitting portion 18. When the wide portion-side lips 31 and the inner periphery of the wide portion 30 of the outer support member 17 are in close contact, the wide portion 30 of the outer support member 17 and the sheath fitting portion 18 of the rubber plug 15 are sealed.

Figure 7:
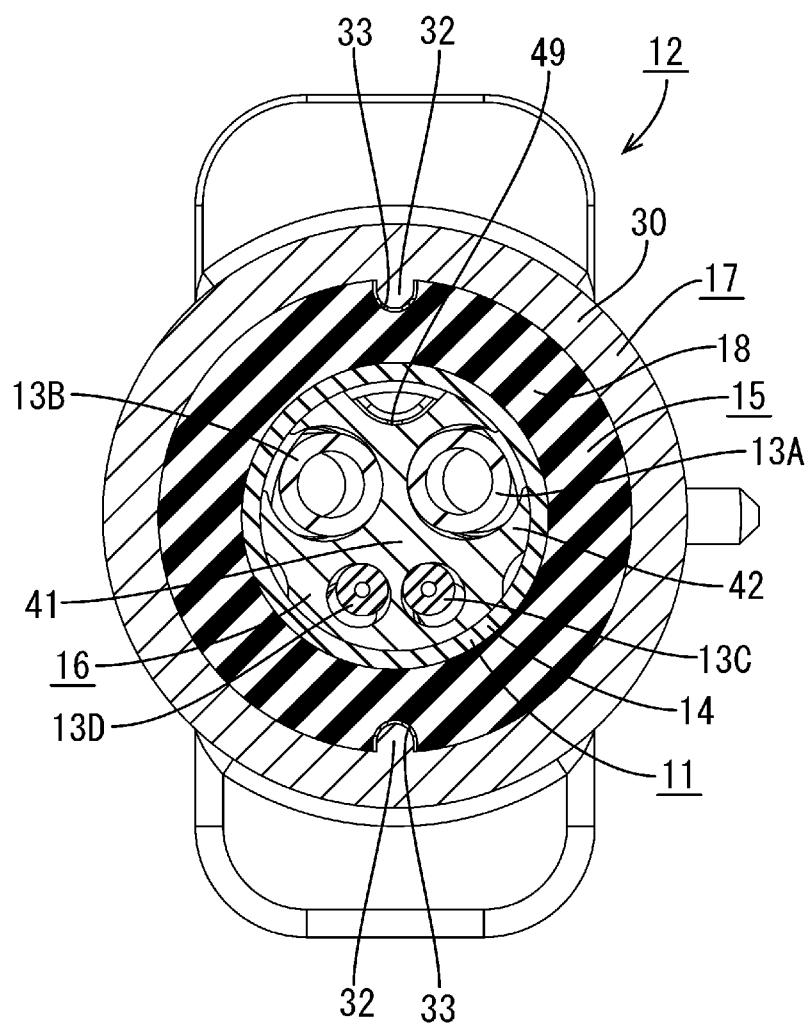
FIG. 7 is a cross-sectional view taken along line VII-VII in FIG. 6.

As shown in FIG. 7, a plurality (two in the present embodiment) of rubber plug locking portions 32, which are shaped as ribs that extend along the direction in which the outer support member 17 is open, are formed on the inner portion of the wide portion 30 of the outer support member 17. The two rubber plug locking portions 32 are formed at positions that oppose each other on the inner periphery of the wide portion 30.

As shown in FIG. 7, two rubber plug locked portions 33, into which the plurality (two in the present embodiment) of rubber plug locking portions 32 are fitted, are formed as groove-shaped recessions along the direction in which the sheath fitting portion 18 extend on the outer periphery of the sheath fitting portion 18 of the rubber plug 15. The two rubber plug locked portions 33 are formed at positions that respectively correspond with the two rubber plug locking portions 32 formed on the wide portion 30.

When the rubber plug locking portions 32 of the wide portion 30 lock to the rubber plug locked portions 33 of the sheath fitting portion 18, rotation of the rubber plug 15 in the circumferential direction of the rubber plug 15 relative to the outer support member 17 is suppressed.

As shown in FIG. 7, in the state where the wide portion 30 of the outer support member 17 is fitted around the sheath fitting portion 18 of the rubber plug 15, the wide portion 30 presses the sheath fitting portion 18 inward in the diameter direction of the sheath fitting portion 18. Accordingly, the sheath fitting portion 18 is pressed against the outer periphery of the sheath 14 from the outside. Accordingly, the sheath-side lips 20 of the sheath fitting portion 18 reliably come into close contact with the outer periphery of the sheath 14.

Figure 8:
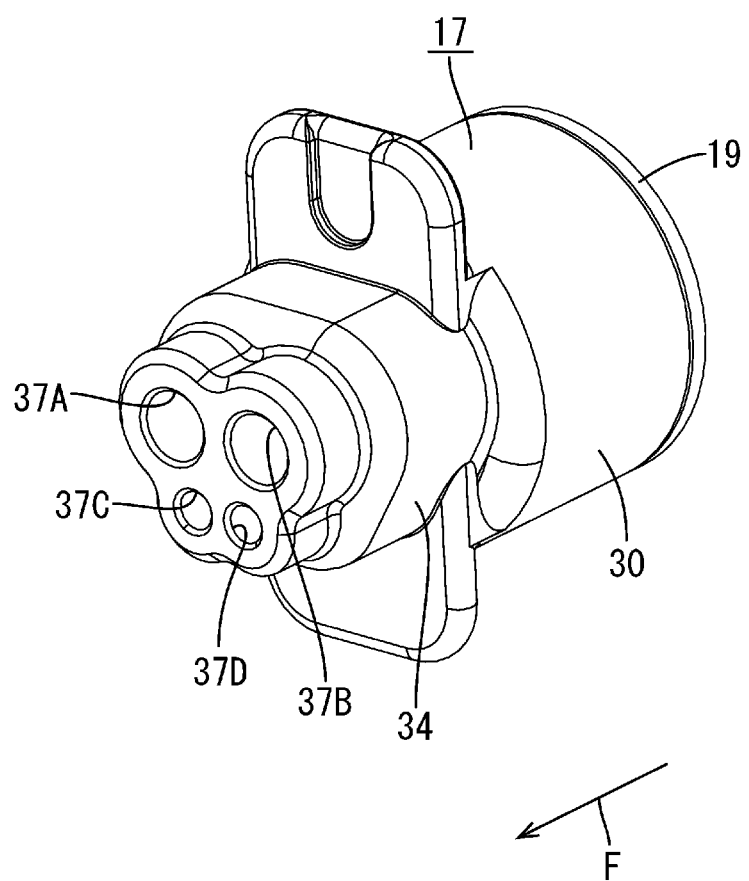
FIG. 8 is a perspective view showing an outer support member.

As shown in FIGS. 3 to 5, a narrow portion 34 that is fitted around the electrical wire through-hole portion 21 of the rubber plug 15 is provided at a position in the outer support member 17 that is opposite (frontward) to the direction in which the outer support member 17 is open relative to the wide portion 30. The outer diameter of the narrow portion 34 is set to be smaller than the outer diameter of the wide portion 30. As shown in FIG. 8, the cross-sectional shape of the narrow portion 34 is a rounded-corner trapezoid that conforms to the outer shape of the electrical wire through-hole portion 21.

As shown in FIGS. 3 and 4, the inner periphery of the narrow portion 34 comes into close contact with a plurality (three in the present embodiment) of narrow portion-side lips 35 formed on the outer periphery of the electrical wire through-hole portion 21. As shown in FIG. 9, the narrow portion-side lips 35 are formed on the outer circumferential surface of the electrical wire through-hole portion 21, protruding outward and extend along the circumferential direction of the electrical wire through-hole portion 21. When the narrow portion-side lips 35 come into close contact with the inner periphery of the narrow portion 34 of the outer support member 17, the narrow portion 34 of the outer support member 17 and the electrical wire through-hole portion 21 of the rubber plug 15 are sealed.

As shown in FIGS. 3 and 4, in the state where the narrow portion 34 of the outer support member 17 is fitted around the electrical wire through-hole portion 21 of the rubber plug 15, the narrow portion 34 presses the electrical wire through-hole portion 21 inward in the diameter direction of the electrical wire through-hole portion 21. Accordingly, the electrical wire through-hole portion 21 is compressed from the outside. Accordingly, the first to fourth electrical wire-side lips 26D formed on the inner peripheries of the first to fourth through-holes 22D are reliably brought into close contact with the radially outer sides of the first to fourth electrical wires 13A, 13B, 13C, and 13D respectively.

As shown in FIGS. 3 and 4, the outer support member 17 is provided with a deep-side wall 36 at a position that is opposite to the direction in which the outer support member 17 is open. A first lead-out hole 37A, a second lead-out hole 37B, a third lead-out hole 37C, and a fourth lead-out hole 37D are formed in the deep-side wall 36 in a manner of passing through the deep-side wall 36 such that the first electrical wire 13A, the second electrical wire 13B, the third electrical wire 13C, and the fourth electrical wire 13D respectively extend out from the outer support member 17.

As shown in FIG. 7, when the rubber plug locking portions 32 formed on the wide portion 30 of the outer support member 17 lock to the rubber plug locked portions 33 formed in the sheath fitting portion 18 of the rubber plug 15, the rubber plug 15 is positioned relative to the outer support member 17. Accordingly, as shown in FIGS. 3 and 4, the first to fourth through-holes 22A, 22B, 22C, and 22D formed in the rubber plug 15 are aligned with the first to fourth lead-out holes 37A, 37B, 37C, and 37D formed in the outer support member 17. More specifically, the first through-hole 22A and the first lead-out hole 37A are aligned with each other, the second through-hole 22B and the second lead-out hole 37B are aligned with each other, the third through-hole 22C and the third lead-out hole 37C are aligned with each other, and the fourth through-hole 22D and the fourth lead-out hole 37D are aligned with each other.

Figure 11:
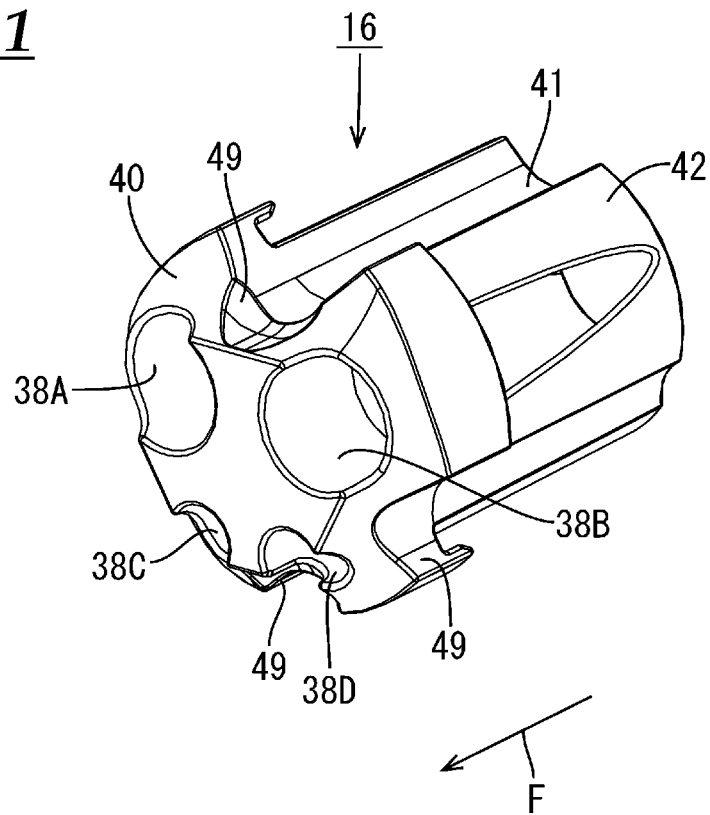
FIG. 11 is a perspective view showing an inner support member.
Figure 13:
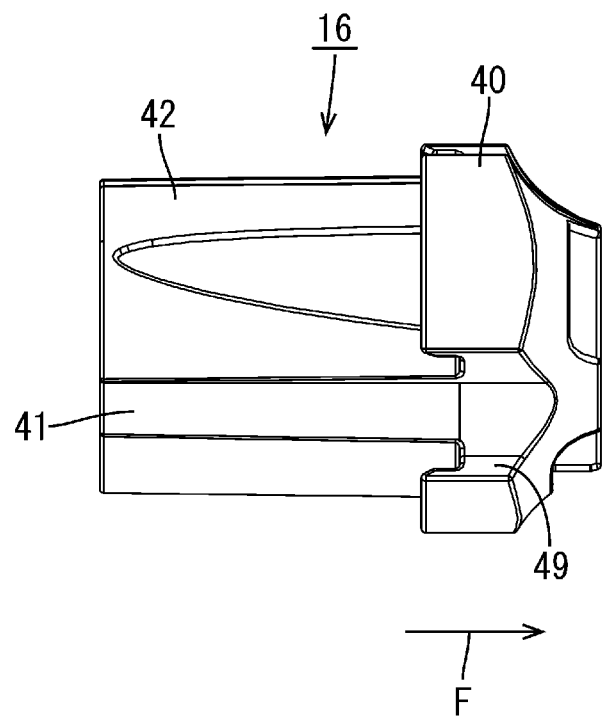
FIG. 13 is a side view showing the inner support member.

As shown in FIGS. 11 to 13, the inner support member 16 is made of a synthetic resin, and has a base portion 40 located outside the sheath 14 and a support portion 41 that extends rearward from the base portion 40 and is arranged inside the sheath 14. The base portion 40 is provided with a first guide hole 38A for passage of the first electrical wire 13A, a second guide hole 38B for passage of the second electrical wire 13B, a third guide hole 38C for passage of the third electrical wire 13C, and a fourth guide hole 38D for passage of the fourth electrical wire 13D.

As shown in FIG. 10, a plurality (four in the present embodiment) of positioning ribs 48 that protrude inward are formed on the inner periphery of the rubber plug 15.

A plurality (four in the present embodiments) positioning recesses 49, into which the four positioning ribs 48 are fitted, are formed in the base portion 40 of the inner support member 16, receding from the outer periphery of the inner support member 16. The four positioning recesses 49 formed in the inner support member 16 are formed at positions respectively corresponding with the four positioning ribs 48 formed on the rubber plug 15.

The four positioning ribs 48 formed on the inner periphery of the rubber plug 15 respectively engage with the four positioning recesses 49 formed in the inner support member 16. Accordingly, the inner support member 16 is held in a state where rotation in the circumferential direction of the inner support member 16 relative to the rubber plug 15 is suppressed. Accordingly, the rubber plug 15 and the inner support member 16 are positioned relative to each other. As a result, as shown in FIGS. 3 and 4, the first to fourth through-holes 22A, 22B, 22C, and 22D of the rubber plug 15 are respectively aligned with the first to fourth guide holes 38A, 38B, 38C, and 38D of the inner support member 16. More specifically, the first through-hole 22A and the first guide hole 38A are aligned with each other, the second through-hole 22B and the second guide hole 38B are aligned with each other, the third through-hole 22C and the third guide hole 38C are aligned with each other, and the fourth through-hole 22D and the fourth guide hole 38D are aligned with each other.

The support portion 41 has the support wall 42 extending rearward and inward along the sheath 14. An outer surface of the support wall 42 extends along an inner surface of the sheath 14 in the state in which the support portion 41 is arranged inside the sheath 14. The sheath 14 has a portion sandwiched between the inner surface of the sheath fitting portion 18 of the rubber plug 15 and the outer surface of the support wall 42.

The support portion 41 is provided with the first to fourth guide holes 38A to 38D formed communicably in the base portion 40. Also, the outer surface of the support portion 41 is provided with the positioning recesses 49 that are formed in the base portion 40 and extend rearward.

Effects of Embodiment

Next, the effects of the present embodiment will be described. The seal structure 12 for the cable 11 according to the present embodiment includes the cable 11 in which the first to fourth electrical wires 13A to 13D are enveloped by the sheath 14, the first to fourth electrical wires 13A to 13D extending out from the end portion 14A of the sheath 14, the rubber plug 15 that is fitted around the end portion 14A of the sheath 14, and the inner support member 16 having the support portion 41 arranged inside the end portion 14A of the sheath 14.

According to the above-described configuration, the rubber plug 15 that is fitted around the end portion 14A of the sheath 14 presses inwardly the end portion 14A of the sheath 14. At this time, the support portion 41 of the inner support member 16 is arranged inside the end portion 14A of the sheath 14, and thus the end portion 14A of the sheath 14 is reliably in close contact with the rubber plug 15 by being held between the rubber plug 15 and the support portion 41. As a result, it is possible to reliably seal the sheath 14 and the rubber plug 15.

Also, in the present embodiment, the support portion 41 has the support wall 42 extending inward along the sheath 14.

According to the above-described configuration, the sheath 14 is held between the support wall 42 and the rubber plug 15, and thus it is possible to reliably seal the sheath 14 and the rubber plug 15.

Also, in the present embodiment, an outer support member 17 that presses the rubber plug 15 inward is preferably fitted around the rubber plug 15.

According to the above-described configuration, the rubber plug 15 is pressed inward by the outer support member 17, and thus the sheath 14 and the rubber plug 15 are reliably in close contact with each other. As a result, it is possible to reliably seal the sheath 14 and the rubber plug 15.

Also, in the present embodiment, the cable 11 includes the first to fourth electrical wires 13A to 13D, the first to fourth electrical wires 13A to 13D extend out from the end portion 14A of the sheath 14, and the rubber plug 15 has the first to fourth through-holes 22A to 22D for passage of the first to fourth electrical wires 13A to 13D respectively.

According to the above-described configuration, it is possible to reliably waterproof the first to fourth electrical wires 13A to 13D.

Also, in the present embodiment, the inner support member 16 has the first to fourth guide holes 38A to 38D for passage of the first to fourth electrical wires 13A to 13D respectively, and the first to fourth guide holes 38A to 38D are arranged at positions that respectively correspond with the first to fourth through-holes 22A to 22D.

According to the above-described configuration, it is possible to reliably pass the first to fourth electrical wires 13A to 13D respectively through the first to fourth through-holes 22A to 22D provided in the rubber plug 15. Accordingly, it is possible to reliably achieve close contact between the outer peripheries of the first to fourth electrical wires 13A to 13D and the inner peripheries of the first to fourth through-holes 22A to 22D. As a result, it is possible to improve the sealing property of the first to fourth electrical wires 13A to 13D.

Embodiment 2

Figure 14:
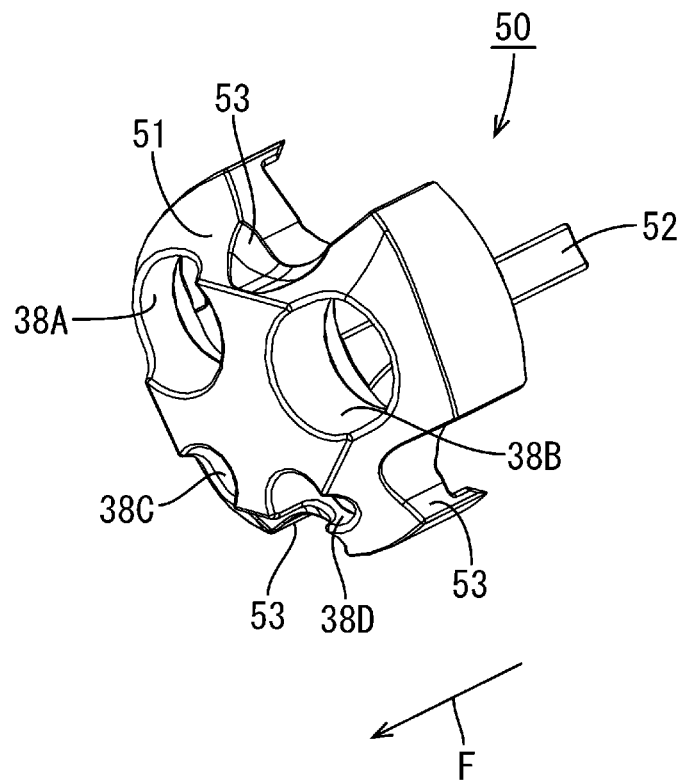
FIG. 14 is a perspective view showing an inner support member according to Embodiment 2.
Figure 15:
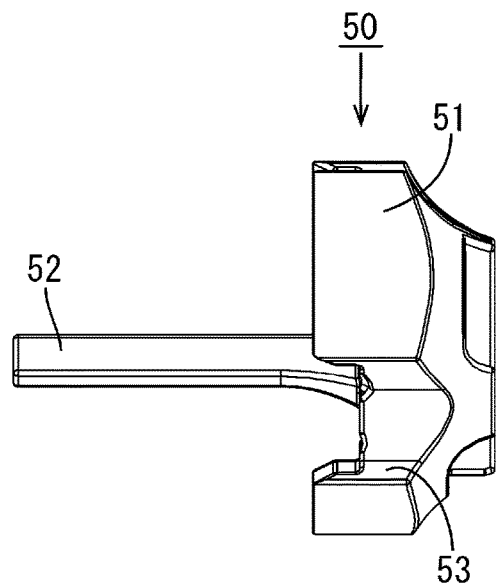
FIG. 15 is a side view showing the inner support member.
Figure 16:
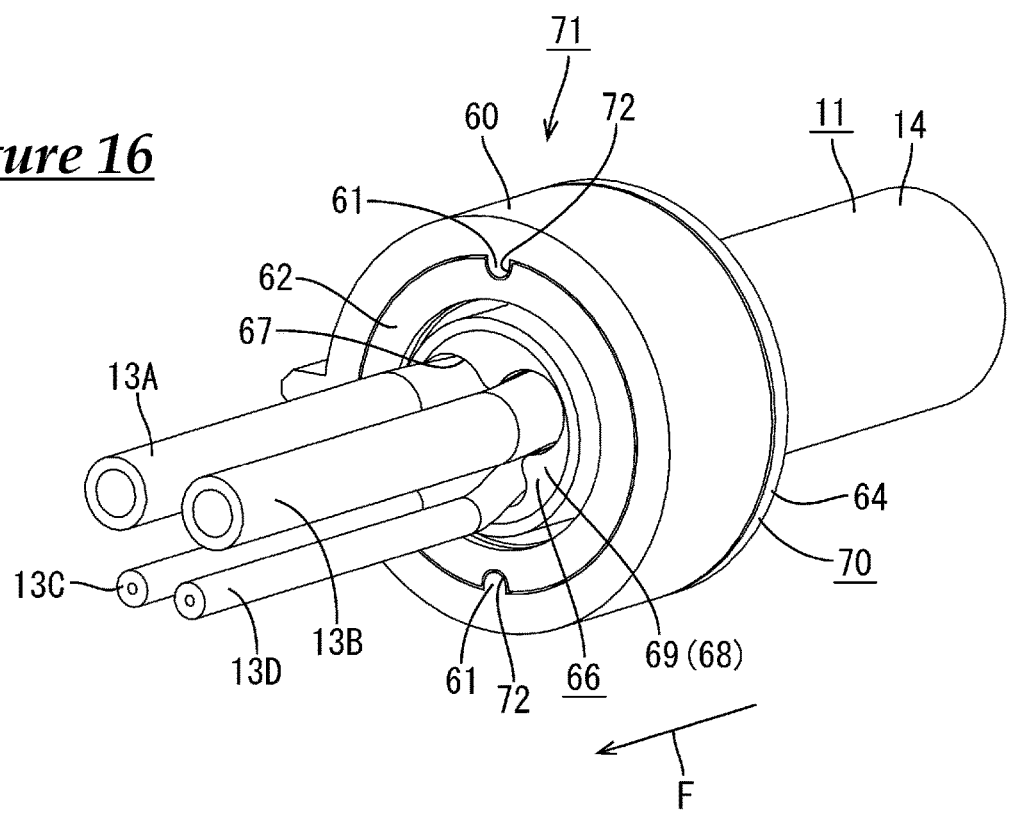
FIG. 16 is a perspective view showing a seal structure for a cable according to Embodiment 3.
Figure 17:
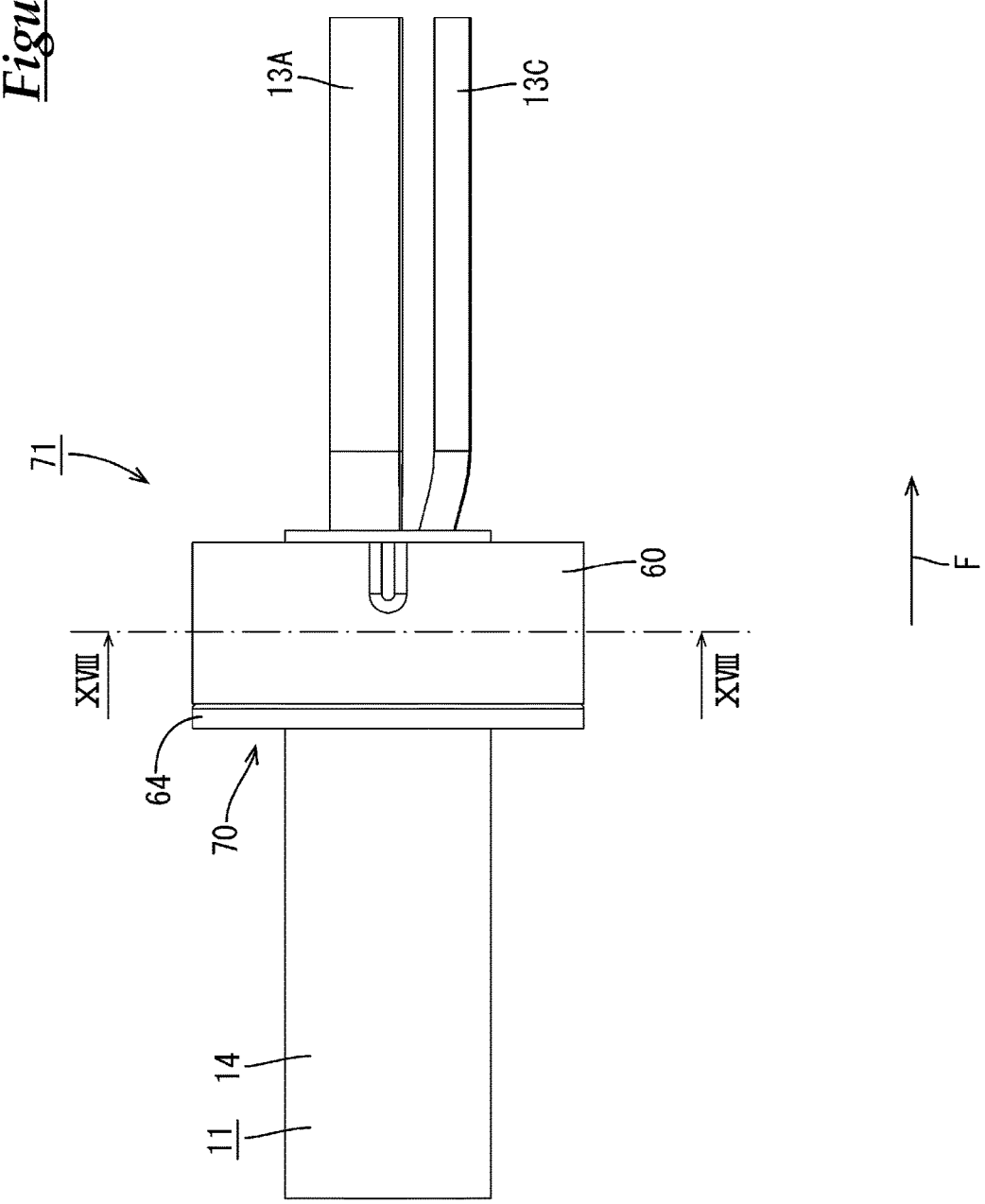
FIG. 17 is a side view showing the seal structure for a cable.
Figure 18:
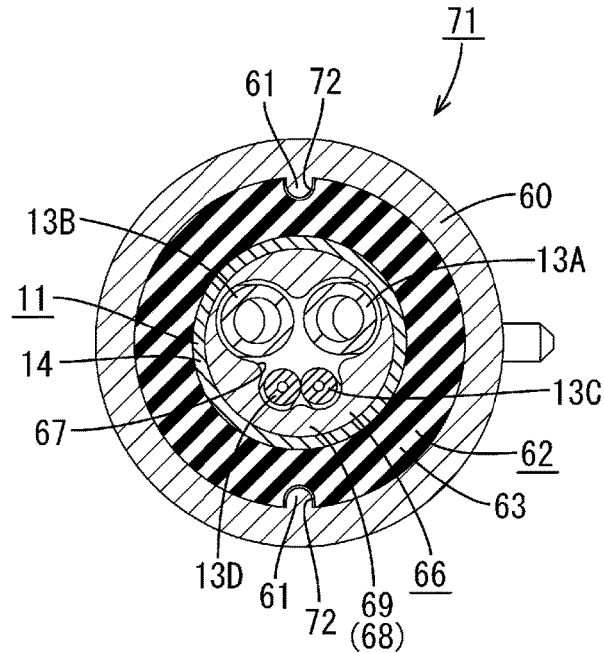
FIG. 18 is a cross-sectional view taken along line XVIII-XVIII in FIG. 17.
Figure 19:
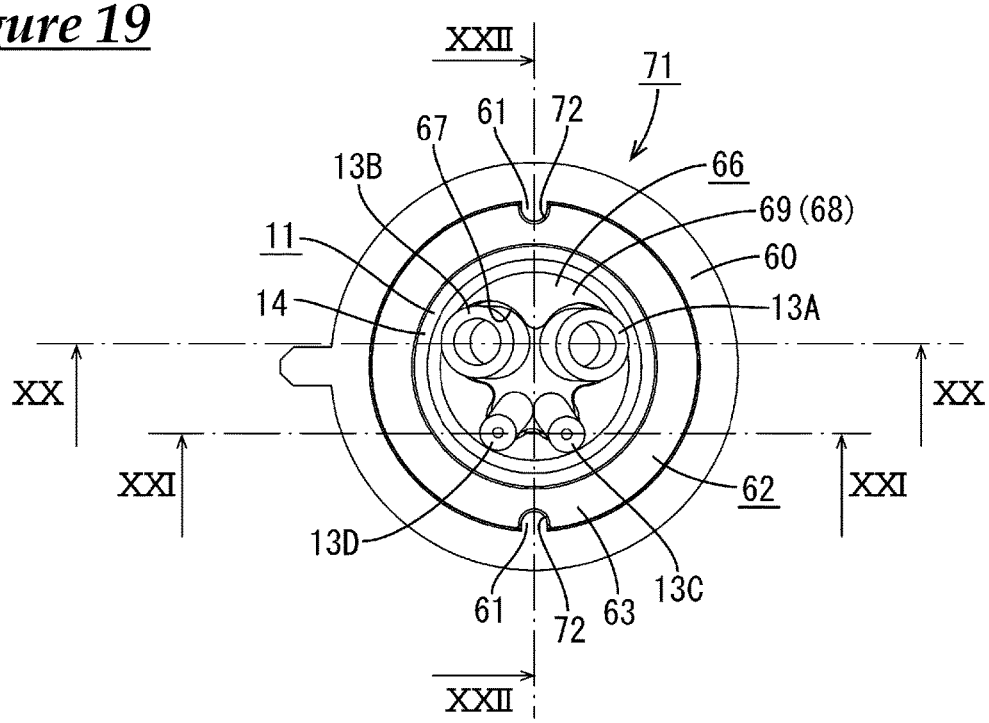
FIG. 19 is a front view showing the seal structure for a cable.
Figure 20:
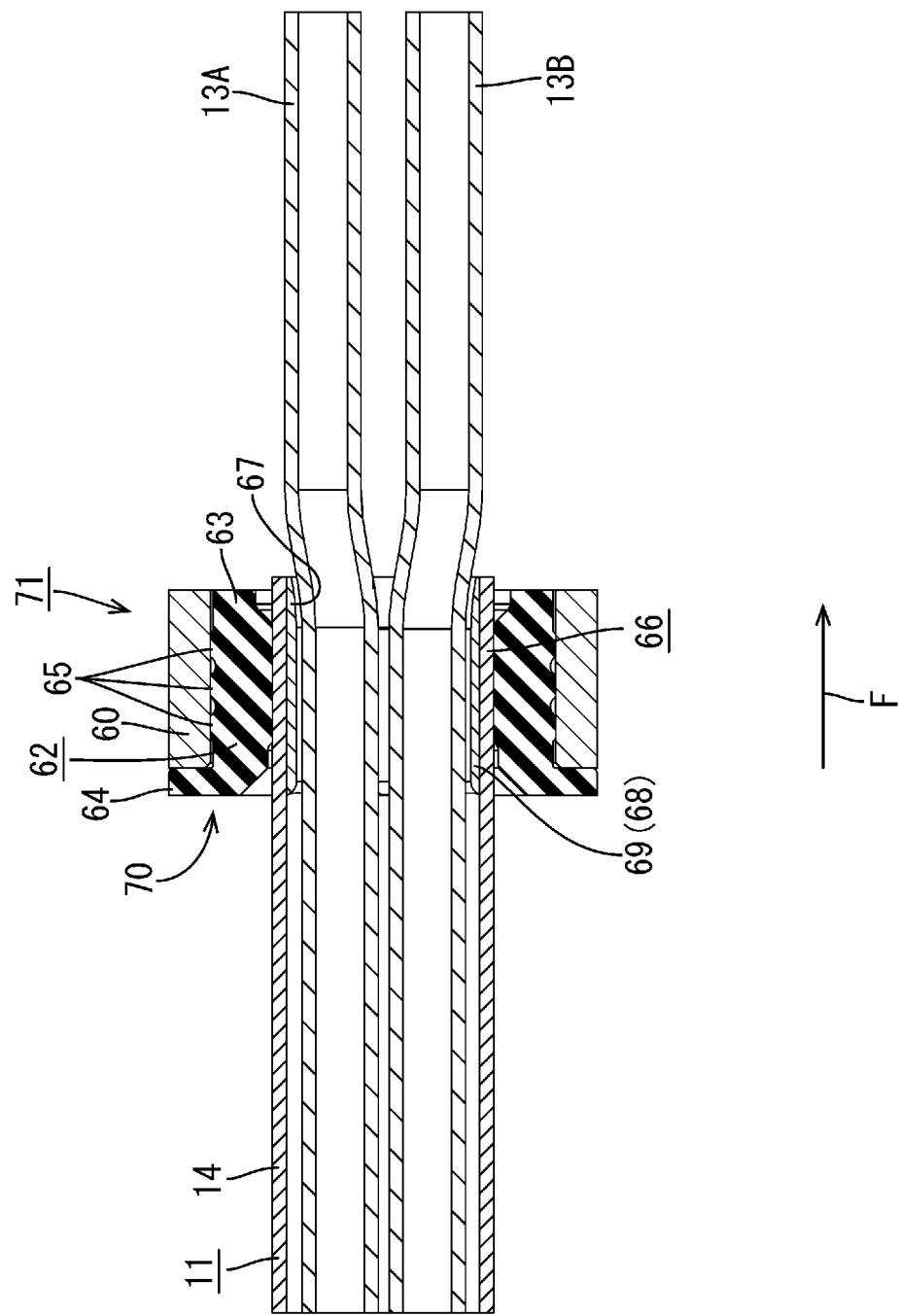
FIG. 20 is a cross-sectional view taken along line XX-XX in FIG. 19.
Figure 21:
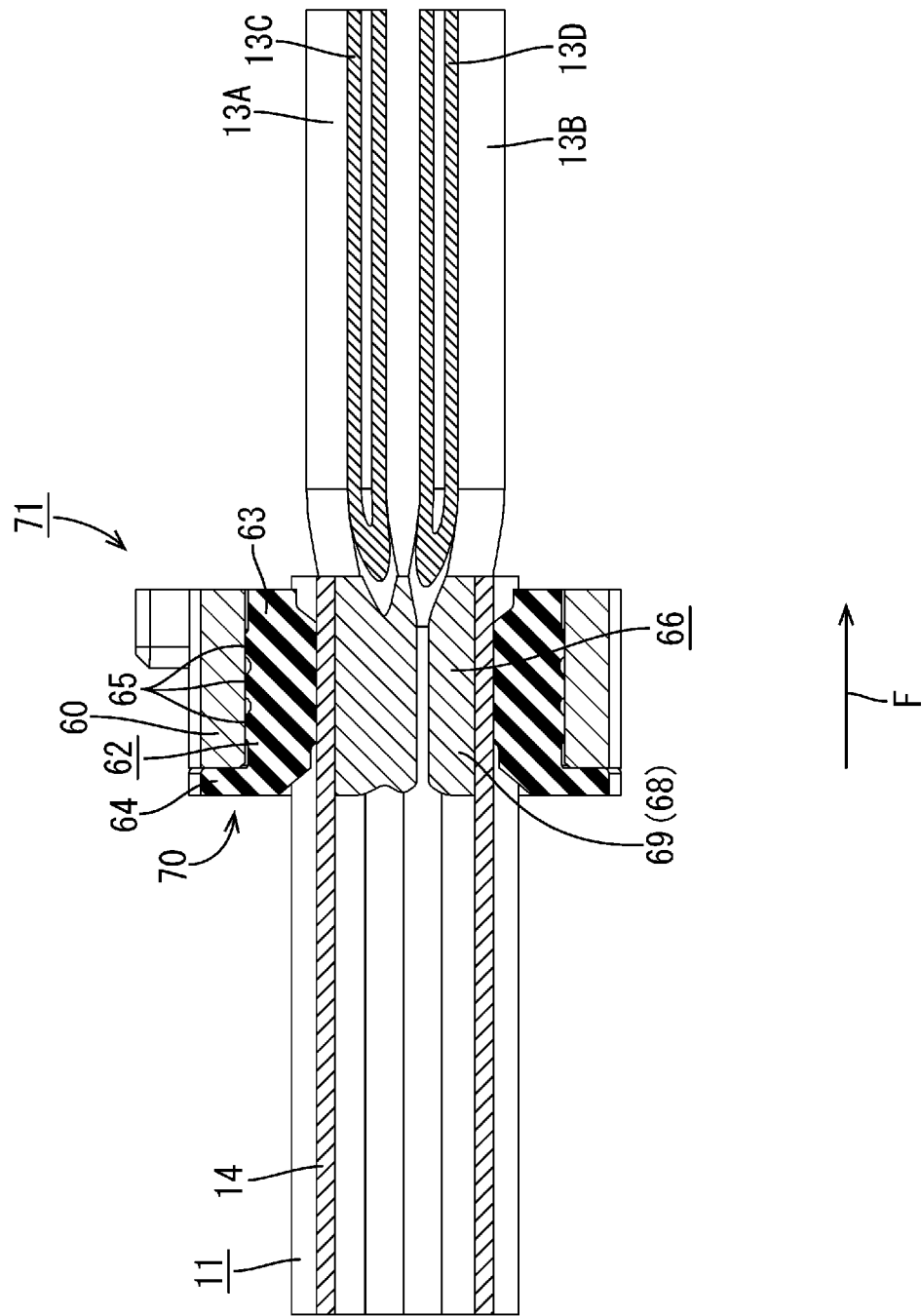
FIG. 21 is a cross-sectional view taken along line XXI-XXI in FIG. 19.
Figure 22:
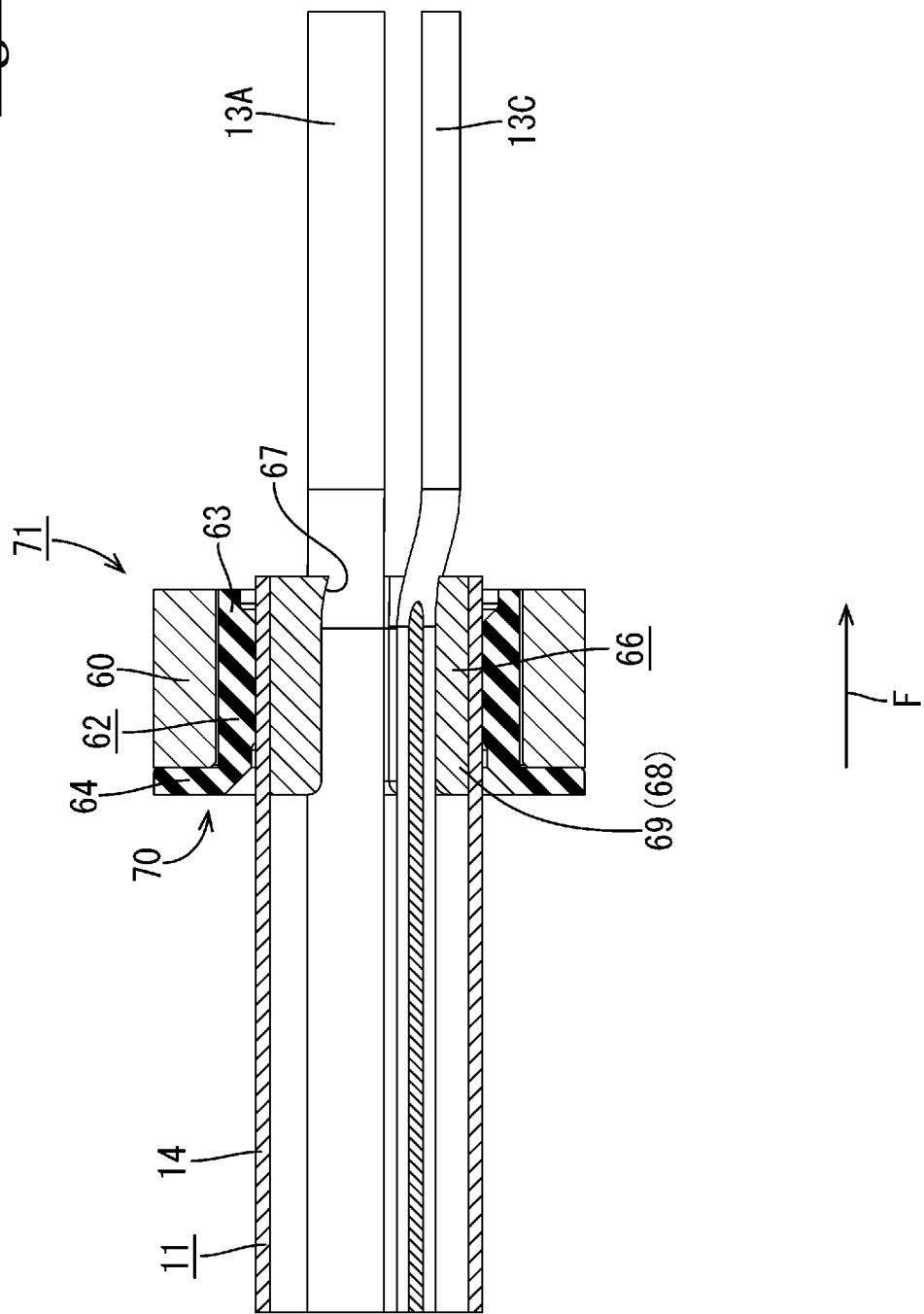
FIG. 22 is a cross-sectional view taken along line XXII-XXII in FIG. 19.
Figure 23:
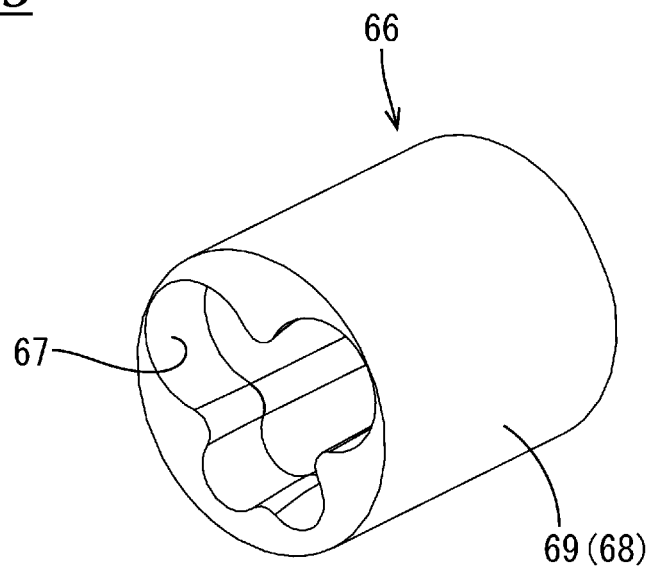
FIG. 23 is a perspective view showing an inner support member.
Figure 24:
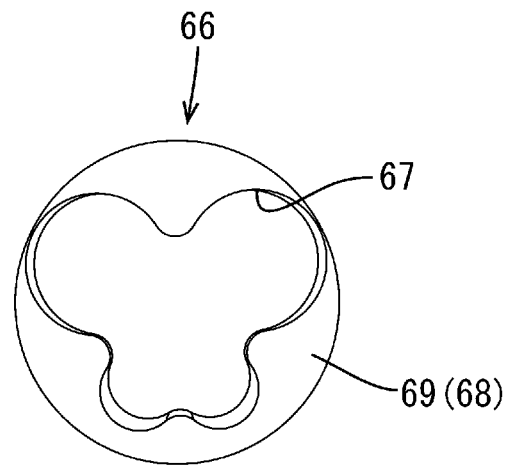
FIG. 24 is a front view showing the inner support member.

Next, Embodiment 2 according to the technology disclosed in this specification will be described with reference to FIGS. 14 and 15.

An inner support member 50 according to the present embodiment has a base portion 51 and a support portion 52 extending rearward of the base portion 51. As shown in FIG. 15, the support portion 52 extends from a substantially central position of the base portion 51 and has a rod shape.

The structures other than the above are substantially the same as those of Embodiment 1, and thus the same members are given the same reference numerals and their redundant description will be omitted.

In the present embodiment, the support portion 52 is located inside the end portion 14A of the sheath 14 in a state in which the inner support member 50 is arranged inside the sheath 14. Accordingly, the first to fourth electrical wires 22A to 22D are pressed outward in the diameter direction of the cable 11 by the support portion 52. Accordingly, the first to fourth electrical wires 22A to 22D indirectly press the sheath 14 from the inside due to the support portion 52. As a result, the rubber plug 15 and the sheath 14 are in close contact with each other, and thus it is possible to improve the sealing property of the cable 11.

Embodiment 3

Next, Embodiment 3 to which the seal member 70 disclosed in this specification is applied to a seal structure 71 for a cable 11 will be described with reference to FIGS. 16 to 24.

As shown in FIGS. 16 to 19, the outer support member 60 has a substantially annular shape in the present embodiment. An inner surface of the outer support member 60 is provided with two positioning ribs 61 extending in the front-back direction. The positioning ribs 61 are formed at symmetrical positions.

A rubber plug 62 has a sheath fitting portion 63 that is fitted around the sheath 14 of the cable 11, and a flange 64 formed in a rear end portion of the sheath fitting portion 63. A plurality of lips 65 protrude from an outer surface of the sheath fitting portion 63. Positioning recesses 72, into which the positioning ribs 61 are fitted, are formed at positions corresponding to the positioning ribs 61, receding from the outer surface of the rubber plug 62.

An inner support member 66 is arranged inside the sheath 14. The inner support member 66 is made of a synthetic resin and has a substantially tubular shape. The inner support member 66 is provided with a passage hole 67 for passage of the first to fourth electrical wires 22A to 22D in a manner of passing through the inner support member 66 in the axial direction.

A portion of the inner support member 66 that is arranged inside the sheath 14 can be regarded as a support portion 68. In the present embodiment, the support portion 68 serves as the support wall 69 extending along the inner surface of the sheath 14.

As shown in FIGS. 18, and 20 to 22, the sheath 14 is sandwiched between the outer surface of the support wall 69 and the inner surface of the rubber plug 62. Accordingly, the seal between the sheath 14 and the rubber plug 62 is improved.

The structures other than the above are substantially the same as those of Embodiment 1, and thus the same members are given the same reference numerals and their redundant description will be omitted.

According to the present embodiment, the seal between the sheath 14 and the rubber plug 62 can be improved using a simple configuration.

Other Embodiments

The present invention is not limited to the embodiments described above using the foregoing description and drawings, and embodiments such as the following are also encompassed in the technical scope of the present invention.

The number of electrical wires arranged in the cable 11 may also be one to three, or five or more.

Although the plurality of electrical wires are configured to include two types of electrical wires having different outer diameters, the present invention is not limited to this, and a configuration is possible in which the electrical wires include three or more types of electrical wires having different outer diameter.

The outer diameters of the plurality of electrical wires may be the same.

The electrical wires may be shielded electrical wires. Also, the electrical wires may also be stranded wires that include a core wire obtained by twisting a plurality of metal strands, or may be so-called single-core wires in which the core wire is a metal rod member. In this way, any electrical wires can be appropriately selected as necessary as the electrical wire.

The cable 11 may also be a so-called cab tire cable, or may be a multicore shielded wire in which a plurality of electrical wires are enveloped by a shielding layer. In this way, any cable 11 can be appropriately selected as necessary as the cable 11.

According to the seal member 10 or the seal structure 12 of the present embodiment, any liquid such as water, oil, or an organic solvent can be sealed out as necessary.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Seal member
11 Cable
12 Seal structure
13A First electrical wire
13B Second electrical wire
13C Third electrical wire
13D Fourth electrical wire
14 Sheath
15, 62 Rubber plug
16, 50, 66 Inner support member
17, 60 Outer support member
22A First through-hole
22B Second through-hole
22C Third through-hole
22D Fourth through-hole
38A First guide hole
38B Second guide hole
38C Third guide hole
38D Fourth guide hole
41, 52, 68 Support portion
42, 69 Support wall

The invention claimed is:

1. A seal structure for a cable, comprising:
a cable in which an electrical wire is enveloped by a sheath, the electrical wire extending out from an end portion of the sheath;
a rubber plug that is fitted around the end portion of the sheath; and
an inner support member having a support portion arranged inside the end portion of the sheath.

2. The seal structure for a cable according to claim 1, wherein the support portion has a support wall extending inward along the sheath.

3. The seal structure for a cable according to claim 1, wherein an outer support member that presses the rubber plug inward is fitted around the rubber plug.

4. The seal structure for a cable according to claim 1, wherein cable includes a plurality of the electrical wires, the plurality of electrical wires extending out from the end portion of the sheath, and the rubber plug has a plurality of though-holes for passage of the plurality of electrical wires respectively.

5. The seal structure for a cable according to claim 4, wherein the inner support member has a plurality of guide holes for passage of the plurality of electrical wires respectively, and
the plurality of guide holes are arranged at positions that respectively correspond with the plurality of through-holes.

6. A seal member for attachment to a cable in which an electrical wire is enveloped by a sheath, the electrical wire extending out from an end portion of the sheath, the seal member comprising:
a rubber plug that is fitted around the end portion of the sheath; and
an inner support member having a support portion arranged inside the end portion of the sheath.

7. The seal member according to claim 6, wherein the support portion has a support wall extending inward along the sheath.

8. The seal member according to claim 6, wherein an outer support member that presses the rubber plug inward is fitted around the rubber plug.

9. The seal member according to claim 6, wherein the cable includes a plurality of the electrical wires, the plurality of electrical wires extending out from the end portion of the sheath, and
the rubber plug has a plurality of through-holes for passage of the plurality of electrical wires respectively.

10. The seal member according to claim 9, wherein the inner support member has a plurality of guide holes for passage of the plurality of electrical wires respectively, and
the plurality of guide holes are arranged at positions that respectively correspond with the plurality of through-holes.

* * * * *